March 30, 1965 A. W. SHARP ETAL 3,175,244
METHOD OF PROCESSING GIZZARDS OF FOWLS
Filed Feb. 16, 1962 2 Sheets-Sheet 1
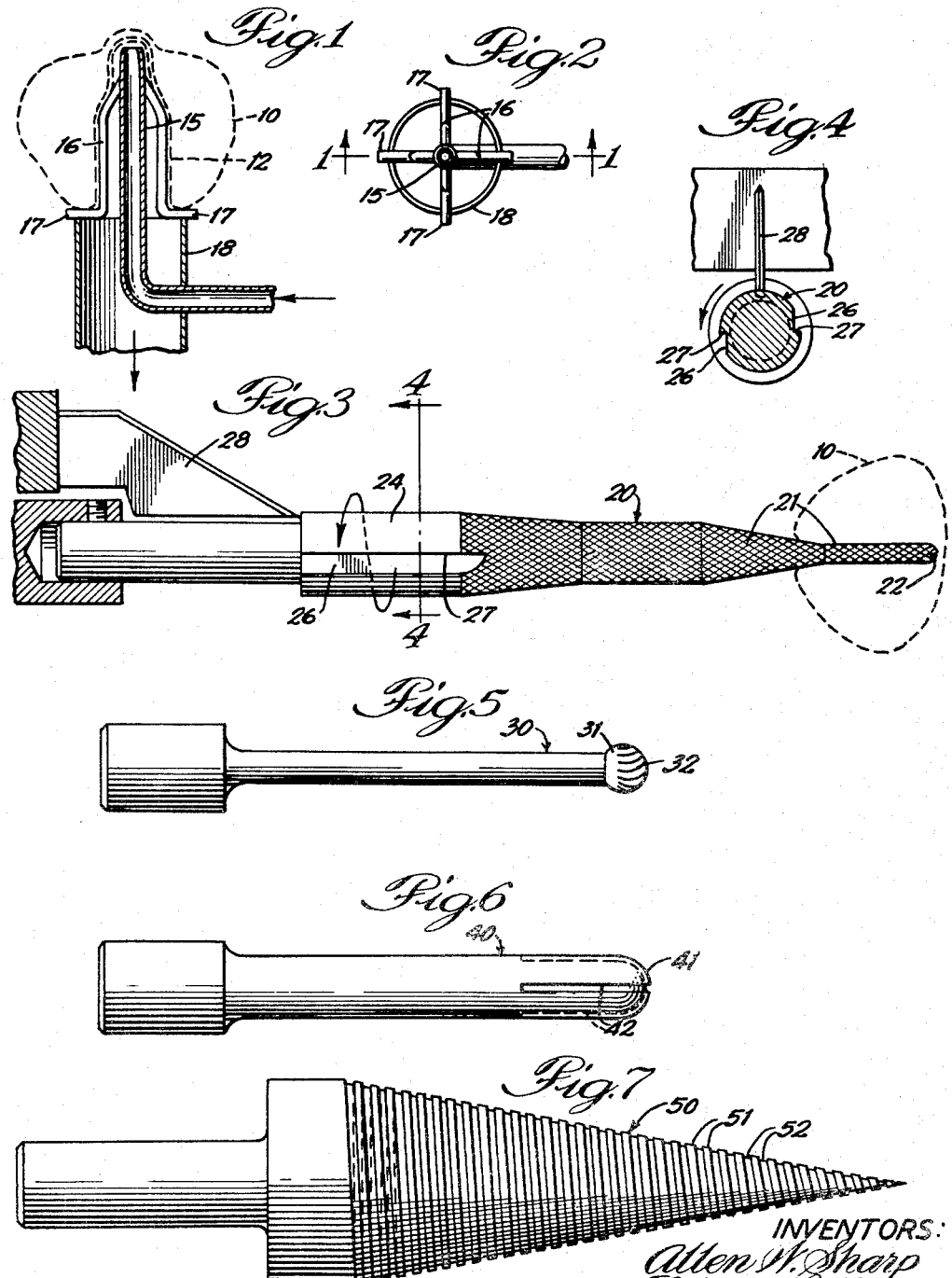
INVENTORS:
Allen W. Sharp
and Edward J. Crane,
BY Bair, Freeman & Molinare
ATTORNEYS.

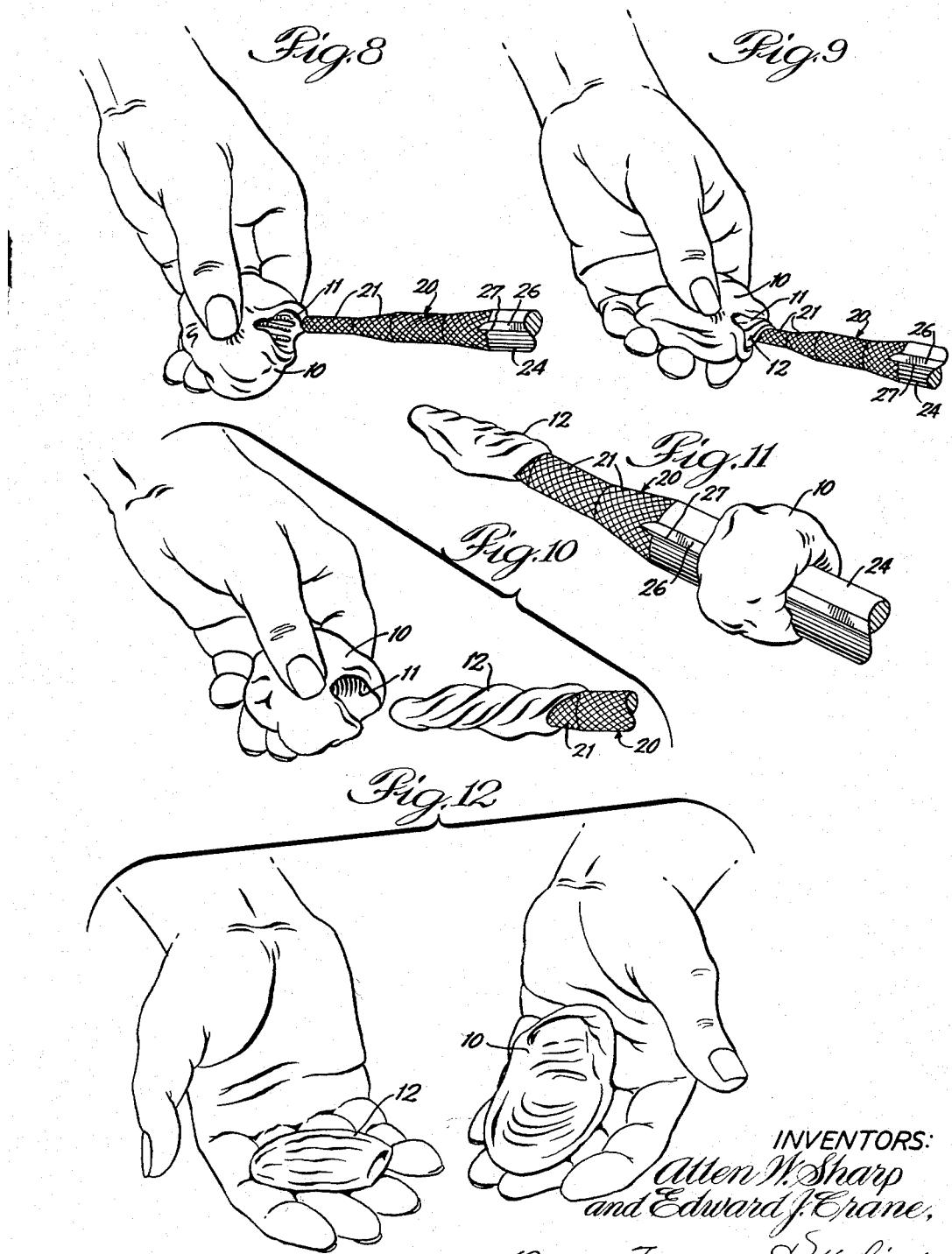

United States Patent Office 3,175,244
Patented Mar. 30, 1965

3,175,244
METHOD OF PROCESSING GIZZARDS OF FOWLS
Allen W. Sharp and Edward J. Crane, Ottumwa, Iowa, assignors, by mesne assignments, to Equity Financial Corporation, a corporation of Delaware
Filed Feb. 16, 1962, Ser. No. 173,745
6 Claims. (Cl. 17—45)

This invention relates to a novel method for processing gizzards of fowls.

The methods and apparatus currently used in the processing of gizzards of fowls have long been recognized as unsatisfactory because they require substantial manual handling, consuming a substantial amount of time, which adds appreciably to the cost of processing. One form of apparatus currently employed in connection with the removal of the contents from the gizzards is relatively inefficient and results in the gizzards only being partially cleansed to the extent of 10% to 25%, making it necessary to inspect all of the gizzards being processed, and to finish cleansing of a relatively large percentage of them by hand—all of which adds greatly to the cost of processing. Moreover, currently employed methods and apparatus are such that they usually result in the loss of a substantial portion of the fat associated with the gizzards, by the mechanical action of the apparatus, which reduces the yield and results in financial loss to the processor.

It also is recognized that currently employed methods and apparatus are such as to result in substantial contamination of the fat associated with the gizzards by the grit and contents of the gizzards, while they are being processed—which results in the necessity for removal and trimming off of the fat, with the resulting reduction in yield and loss to the processor. One extensively used type of apparatus for skinning or peeling the linings of the gizzards is of the roller type. This construction is such that even if the fat associated with the gizzards has not become contaminated by grit, gravel and the like during cleansing of the gizzard cavity, it frequently happens that the fat is pulled off the gizzards by the rollers, so that there is a loss to the processor. Furthermore, the fat from the gizzards frequently causes clogging of the rollers so that they are incapable of efficiently performing their function.

One of the objects of this invention is to provide a novel and effective method for removing the grit and other contents from the cavities of the gizzards while they are in an unslit condition, i.e., without first having been slit from end to end. By virtue of this novel method and apparatus, the gizzards are caused to be processed in a very sanitary manner for efficiently removing the grit and contents from the cavities of the gizzards, while substantially eliminating contamination of the fat of the gizzard by its contents, thus increasing the yield to the processor.

Another object is to provide a novel and efficient method of removing the lining from the gizzards in an unslit condition, i.e., without first having been slit from end to end, in a manner so as not to contaminate or remove the fat associated with the gizzards, thus insuring increase in yield to the processor.

A still further object is to provide a novel method for processing gizzards of fowls in a manner which lends itself to automation to a much greater extent than currently existing types of apparatus.

It is also an object of this invention to provide a novel and improved method for efficiently processing gizzards of fowls in a manner which effects substantial savings in labor, and which results in increased financial benefits to the processor.

Other objects and advantages of this invention will be apparent from the following description, taken in connection with the accompanying drawings, in which:

FIGURE 1 is a vertical, sectional, enlarged view of our novel apparatus for flushing the contents from a gizzard, while in an unslit condition, taken substantially as indicated at line 1—1 on FIGURE 2.

FIGURE 2 is a top plan view of the flushing apparatus shown in FIGURE 1.

FIGURE 3 is a view, part in section and part in elevation, of the novel apparatus embodying the present invention utilized for removal of the lining from a gizzard in an unslit condition, including a rotatable arbor, together with a knife for subsequently effecting a slitting of the gizzard from end to end.

FIGURE 4 is a sectional view taken at line 4—4 on FIGURE 3.

FIGURES 5 and 6 are elevational views of arbors of different designs.

FIGURE 7 is an elevational view of an arbor in the nature of a gimlet which, in addition, effects self-feeding of a gizzard there-along.

FIGURE 8 is a perspective view of a gizzard, after the contents have been removed from its cavity, preparatory to placing it in operative position on the end of a rotating arbor for removing the lining of the gizzard.

FIGURE 9 is a view similar to FIGURE 8, showing a gizzard in operative position on the arbor, and with the lining of the gizzard partly gripped and wrapped around the arbor.

FIGURE 10 is a perspective view of a gizzard, in unslit condition, after the lining has been removed, and with the lining wrapped around the arbor.

FIGURE 11 is an enlarged perspective view illustrating the result of the process wherein, after the lining has been removed from the gizzard, the gizzard has been moved axially along the arbor onto a reaming section for insuring the removal of any fragmentary portions of the lining that may adhere to the flesh of the gizzard.

FIGURE 12 is a perspective view showing the lining after it has been removed from the arbor, and the gizzard after it has been completely processed with the lining removed, and slit from end to end.

In order to aid in an understanding of applicants' novel advance in the art of processing gizzards, reference will now be made generally to two currently employed methods of processing:

Method A (1) An operator positioned along an eviscerating line first severs the gizzard from the viscera of the fowl, then trims the gizzard to expose the openings to the stomach and to the small intestine, and cuts the gizzard open from end to end with shears, flushes the grit and contents from the cavity, and then deposits the gizzard in a pan or flume.

(2) Operator No. 2 picks up the opened and flushed gizzard and removes the lining therefrom either by hand or by a powered gizzard peeling machine. The operator then puts the finished gizzard into another pan, or another flume, for final washing and for transportation to a giblet wrapping station.

Method B (1) An operator positioned along the eviscerating line first severs the gizzard from the viscera of the fowl, then trims the gizzards to expose the openings to the stomach and to the small intestine, and the gizzard is then placed on a pin attached to a moving conveyor chain.

(2) The conveyor chain transports the gizzards through a machine that slits the gizzards from end to end, opens them up, and flushes out the grit and contents from the cavities, and discharges the gizzards into a pan or flume.

(3) Operator No. 2 then picks up the opened and flushed gizzards and removes the linings therefrom, usually with a powered gizzard peeling machine. After the removal of the linings, the operator then places the gizzards into a pan or flume for final washing and for transporting to a giblet wrapping station.

In the performance of Method A, a considerable amount of time is consumed in manually opening and flushing the grit and contents from the cavities of the gizzards. In the performance of this operation, grit and other contents from the cavities of the gizzards very frequently get into the fat attached to the outside of the gizzards. Fat which is contaminated with gravel or grit must be removed and discarded, as it is a practical impossibility to remove the gravel and grit from the fat. The loss of the fat reduces the yield and results in financial loss to the processor. In the removal of the linings from the gizzards, considerable labor is utilized in presenting the gizzards to the peeling rolls of the machine, and very frequently any fat remaining on the outside of the gizzards gets caught between the peeling rolls and is discarded along with the linings, which further reduces the yield and results in financial loss to the processor.

In the performance of Method B, the same disadvantages occur, except that by Method B the fat on the outside of the gizzards is more likely to become contaminated with grit and gravel and, further, the machines as currently available are extremely inefficient, effecting a cleansing of the grit and contents from the cavities of the gizzards in the general range of 10% to 25%, thus making it necessary to inspect all gizzards processed, and to finish cleansing a relatively large percentage of the gizzards manually.

As is well known, gizzards of fowls are normally relatively flat, and are oval in cross section, as indicated at 10 in the drawings. In practicing the present invention, the gizzards are first severed from the viscera of the fowls, as they move along an eviscerating line, and are manually trimmed by severance of the connection to the stomach and small intestine. While gizzards in this condition may be properly processed by utilizing the invention of the present method and apparatus, it is preferred, however, that the connections to the stomach and small intestine be simultaneously severed by cutting the end portion of the gizzard at a slight bias to provide a single, slightly larger opening, as indicated at 11, at one end of the gizzard. The gizzard contains interiorly thereof, a relatively flat cavity, the wall of which is covered by a lining, as indicated generally at 12, in the nature of a membrane of relatively tough, fibrous tissue which tenaciously adheres to the flesh of the gizzard. The cavity of the gizzard normally contains gravel, grit and other materials which must be completely removed from the cavity to insure sanitary processing of the gizzards.

To insure thorough and complete removal of all of the contents from the cavities of the gizzards, we provide novel flushing apparatus comprising an upwardly extending jet 15, through which a stream of water under high pressure is discharged. Surrounding the upper portion of the jet 15, in circumferentially spaced apart relation, are a plurality of elongated members 16, which may be in the form of wires, the upper ends of which converge toward and are secured to the outer wall of the jet 15, adjacent the upper end, with their main intermediate portions spaced away from the jet, and having their lower ends bent laterally outwardly to provide feet 17, which are rigidly attached to and seated upon the marginal portion of the upper end of a discharge drain or conduit 18. Said drain conduit is of a size substantially larger than the maximum transverse dimension defined by the guide members 16. A gizzard in unslit condition, i.e., unslit from end to end as is normally the practice, is then placed over the upper end of the high pressure water jet 15 and the associated guide member 16, in a manner as represented in dotted lines in FIGURE 1. The stream of water under high pressure is discharged into the cavity of the gizzard and results in completely flushing the entire contents from the cavity. The guide members 16 tend to open up the cavity of the gizzard to insure thorough flushing and cleansing and cause discharge of the contents of the cavity into the discharge conduit 18, together with the flushing water. Flushing of the gizzards in this manner, in addition to being relatively efficient, consumes very little time.

By virtue of the method and apparatus above described for flushing of the contents from the cavities of the gizzards, it insures that the grit and the soiled water utilized in flushing are discharged directly into the drain conduit 18, so that no portion of the grit or other material, or the flushing fluid, will contact the external parts of the gizzard, such as the fat—and thus precludes contamination of the fat so that the fat may remain permanently attached to the exterior of the gizzards, and thereby increase the yield and financial gain to the processor.

The flushed gizzards are now ready to have the linings removed therefrom. The apparatus utilized for this purpose comprises a rotatable arbor 20, the main portion of which is of a diameter for telescoping into one of the normal openings, or the single slightly enlarged opening, at one end of the gizzard. At least some portion of the exterior surface of the rotating arbor is provided with a roughened area which may be of various sizes and forms, such as, for example, knurling, slots, notches, or threads, and the like.

In the arbor construction represented in FIGURE 3, the main portion of the arbor has its external surface provided with knurling, as indicated at 21, and its free outer end is formed with a series of grooves, as indicated at 22. As seen in FIGURE 3 of the drawings, the portion of the arbor beyond the knurled section is provided with a reaming portion 24 which, as shown, comprises a plurality of longitudinally extending notches or grooves, as indicated at 26, to provide sharp reaming edges, as indicated at 27. Positioned immediately beyond the reaming section is a stationary knife blade 28.

When an unslit gizzard, after the contents have been flushed from the cavity, is first telescoped over the free end portion of the rotating arbor, as indicated at FIGURES 3 and 9, in surrounding relation to the arbor, as gizzard is held against rotation and, because of the roughened surface or surfaces of the arbor, said surfaces bite into and grip the lining 12 of the gizzard, causing the lining to be twisted around the arbor and severed from the flesh of the gizzard, and the lining, as it is separated from the flesh, tends to twist or wrap around the arbor, as seen in FIGURES 9, 10 and 11. When the lining has been completely removed from the cavity of the gizzard, the gizzard may then be further processed by being slit from end to end in the usual manner, and finally washed and transported to a giblet wrapping station. The lining is then removed from the arbor and discarded. The arbors may be quickly and easily cleansed after each use to insure adequate sanitation, and because of the form and construction thereof, and their manner of use, there is no accumulation of fat that remains on the arbors, as exists with all other currently used gizzard peeling machines.

If desired, when the lining of the gizzard is removed, and in the event it is felt that the texture of the gizzard is such that portions of the lining may adhere to the inner surface of the flesh of the gizzard, the gizzard may be moved axially along the rotating arbor, causing the free end of the arbor to be pushed through the normally closed end of the gizzard until the gizzard registers with the reaming portion 24, as seen in FIGURE 11 of the drawings—and by virtue of the sharp edges 27 of the reaming portion of the arbor, any small portions of lining still remaining attached will then be removed. Further movement of the gizzard axially along the arbor while it is held against rotation, will bring it into contact with the stationary knife blade 28 for slitting the gizzard from end to end, so that the gizzard has the appearance of that seen in FIGURE 12 of the drawings. The gizzard is then ready for final washing and transporting to a giblet wrapping station.

The modified form of arbor indicated at 30 in FIGURE 5 of the drawings, has a ball-type head 31, the forward and outer portion of which is formed with a multiplicity of concentric grooves, as indicated at 32.

In the modified form of arbor indicated at 40 in FIGURE 6 of the drawings, the arbor body terminates at its free end in a rounded contour as indicated at 41, and the portion adjacent the free end, and including the free end, is provided with a multiplicity of circumferentially spaced apart, elongated grooves 42.

The form of arbor represented at 50 in FIGURE 7 of the drawings, is in the nature of a gimlet, and the main body portion is of conical formation, and the external surface of which is formed with a continuous spiral of relatively square threads 51, and square grooves 52 in alternate relation. This particular form of arbor has the advantage of aiding the operator in that, once the flushed gizzard is placed in telescopic relation over the end of the arbor, the threads tend to bite into and grip the lining and twist it around the arbor, effecting peeling of the lining from the flesh of the gizzard. Simultaneously, the threads, while the gizzard is being held against rotation, tend to feed the gizzard axially there-along. The gizzard, as it travels along the arbor, will be expanded until such time as it tears itself apart and drops off the arbor, and the lining will remain wrapped around the arbor near the point thereof, until it is either manually or mechanically removed. The gizzards may be caused to drop into a pan or onto a conveyor and finally washed and transported to a giblet wrapping station.

The rotating arbors which may be utilized for practicing the present invention may assume various forms, such at, for example, represented herein, and all perform relatively satisfactorily in efficiently removing the lining from a gizzard. It has been determined that excellent results are obtained in removal of the linings from the gizzards when the arbors are rotating at relatively slow speed in the general range of 25 to 100 r.p.m. It is to be recognized that by removal of the linings from the gizzards while the gizzards are in an unslit condition, the fat adhering to the outer surfaces of the gizzards is in no manner contaminated or pulled off, such as ocrurs in the removal of the linings in currently used gizzard peeling machines. Thus, the fat adhering to the gizzards, by virtue of the present process increases the yield to the processor.

The method and apparatus embodying the present invention lends itself for embodiment in a relatively complete automated system wherein the operator along the eviscerating line severs the gizzard and trims it, then places it, in an unslit condition, on a pin on a moving conveyor. The gizzard may then be transferred from the conveyor pin onto flushing jets, where the contents of the gizzard are thoroughly flushed out by the injection of water under pressure into the cavity of the gizzard. The contents and flushing water are drained away through a large conduit to insure against possible contamination of the fat on the exterior of the gizzard. The gizzard may then be transferred to a roughened, slowly rotating arbor, the gizzard being held against rotation thereon, and by virtue of which the arbor grips a part of the lining and twists it free from the flesh of the gizzard. The gizzard can then be removed from the arbor, slit manually or mechanically, from end to end, and finally washed and transported to a giblet wrapping station. The linings may be removed from the arbors manually or mechanically.

While we have herein shown and described certain preferred embodiments of our invention, manifestly it is capable of modification and rearrangement without departing from the spirit and scope thereof. We do not, therefore, wish to be understood as limiting this invention to the precise embodiments herein disclosed, except as we may be so limited by the appended claims.

We claim:

1. The method of removing the linings from unslit gizzards of fowls which consists in placing each unslit gizzard, with an opening at one end, telescopically over and in surrounding relation to a rotating arbor having a roughened surface and holding the gizzard against rotation, whereby the roughened surface of the arbor grips and effects a separation of the lining from the flesh of the gizzard.

2. The method of removing the linings from unslit gizzards of fowls which consists in the step of placing each unslit gizzard, with an opening at one end, telescopically over and in surrounding relation to a rotating arbor having a roughened surface and holding the gizzard against rotation, whereby the roughened surface of the arbor grips and effects a separation of the lining from the flesh of the gizzard, then the step of forcibly moving the gizzard axially along the arbor and causing the latter to be projected through the normally closed end of the gizzard, and then the step of further moving the gizzard along the arbor over a remaining portion on the arbor to insure the removal of any adhering portions of the lining.

3. The method of removing the linings from unslit gizzards of fowls which consists in the step of placing each unslit gizzard, with an opening at one end, telescopically over and in surrounding relation to a rotating arbor having a roughened surface and holding the gizzard against rotation, whereby the roughened surface of the arbor grips and effects a separation of the lining from the flesh of the gizzard, then the step of forcibly moving the gizzard axially along the arbor and causing the latter to be projected through the normally closed end of the gizzard, then the step of further moving the gizzard along the arbor over a remaining portion on the arbor to insure the removal of any adhering portions of the lining, and then the step of slitting the gizzard from end to end.

4. The method of processing unslit gizzards of fowls which consists in the step of placing each unslit gizzard, with an opening at one end, telescopically over and in surrounding relation to a jet of water under pressure for forcibly flushing the contents from the cavity of the gizzard, then the step of placing the unslit gizzard with the open end fitted over and in surrounding relation to a rotating arbor having a roughened surface, and the step of holding the gizzard against rotation, whereby the roughened surface grips and effects a separation of the lining from the flesh of the gizzard.

5. The method of processing unslit gizzards of fowls which consists in the step of placing each unslit gizzard, with an opening at one end, telescopically over and in surrounding relation to a jet of water under pressure for forcibly flushing the contents from the cavity of the gizzard, then the step of placing the unslit gizzard with the open end fitted over and in surrounding relation to a rotating arbor having a roughened surface, then the step of holding the gizzard against rotation, whereby the roughened surface grips and effects a separation of the lining from the flesh of the gizzard, and then the step of slitting the gizzard from end to end.

6. The method of processing unslit gizzards of fowls which consists in the step of placing each unslit gizzard, with an opening at one end, telescopically over and in surrounding relation to a jet of water under pressure for forcibly flushing the contents from the cavity of the gizzard, then the step of placing the unslit gizzard with the open end fitted over and in surrounding relation to a rotating arbor having a roughened surface, then the step of holding the gizzard against rotation, whereby the roughened surface grips and effects a separation of the lining from the flesh of the gizzard, and finally the step of moving the gizzard further along the arbor into engagement with a knife blade for slitting the gizzard from end to end.

References Cited by the Examiner

UNITED STATES PATENTS

| | | | |
|---|---|---|---|
| 2,427,840 | 9/47 | Davis | 17—11 |
| 2,590,785 | 3/52 | Nealy | 17—11 |
| 2,613,391 | 10/52 | Still | 17—45 |
| 2,723,421 | 11/55 | Smith et al. | 17—11 |
| 2,795,815 | 6/57 | Dahlberg | 17—11 |
| 2,830,318 | 4/58 | Zebarth | 17—45 |
| 3,116,513 | 1/64 | Ine | 17—11 |

SAMUEL KOREN, *Primary Examiner.*

LUCIE H. LAUDENSLAGER, ALDRICH F. MEDBERY, *Examiners.*